Aug. 22, 1933.  C. WADE  1,923,343
CONTROLLING APPARATUS FOR AUTOMOBILE SIGNAL SYSTEMS
Filed Dec. 3, 1931  2 Sheets-Sheet 1
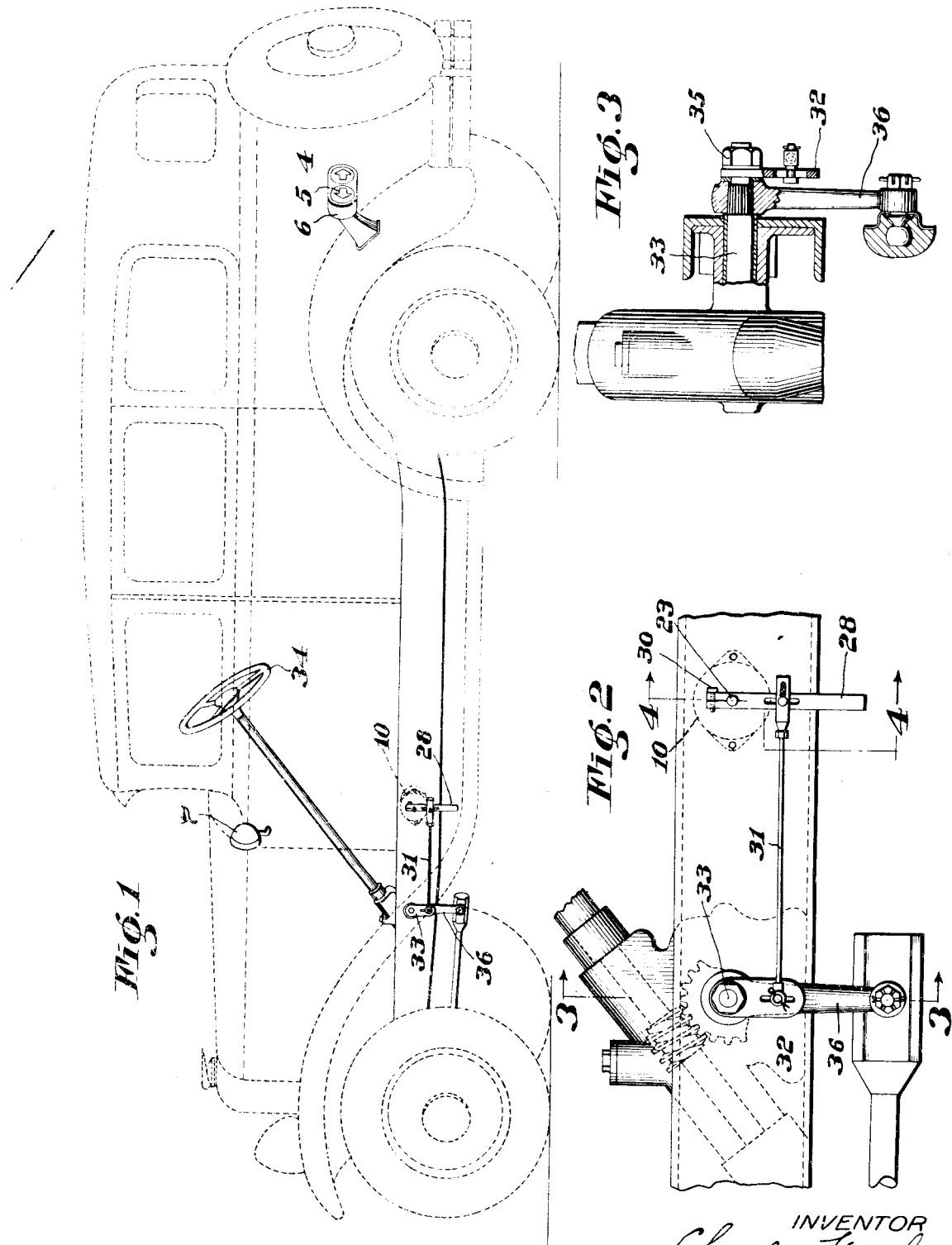
INVENTOR
Charles Wade,
BY
J. H. McReady
ATTORNEY

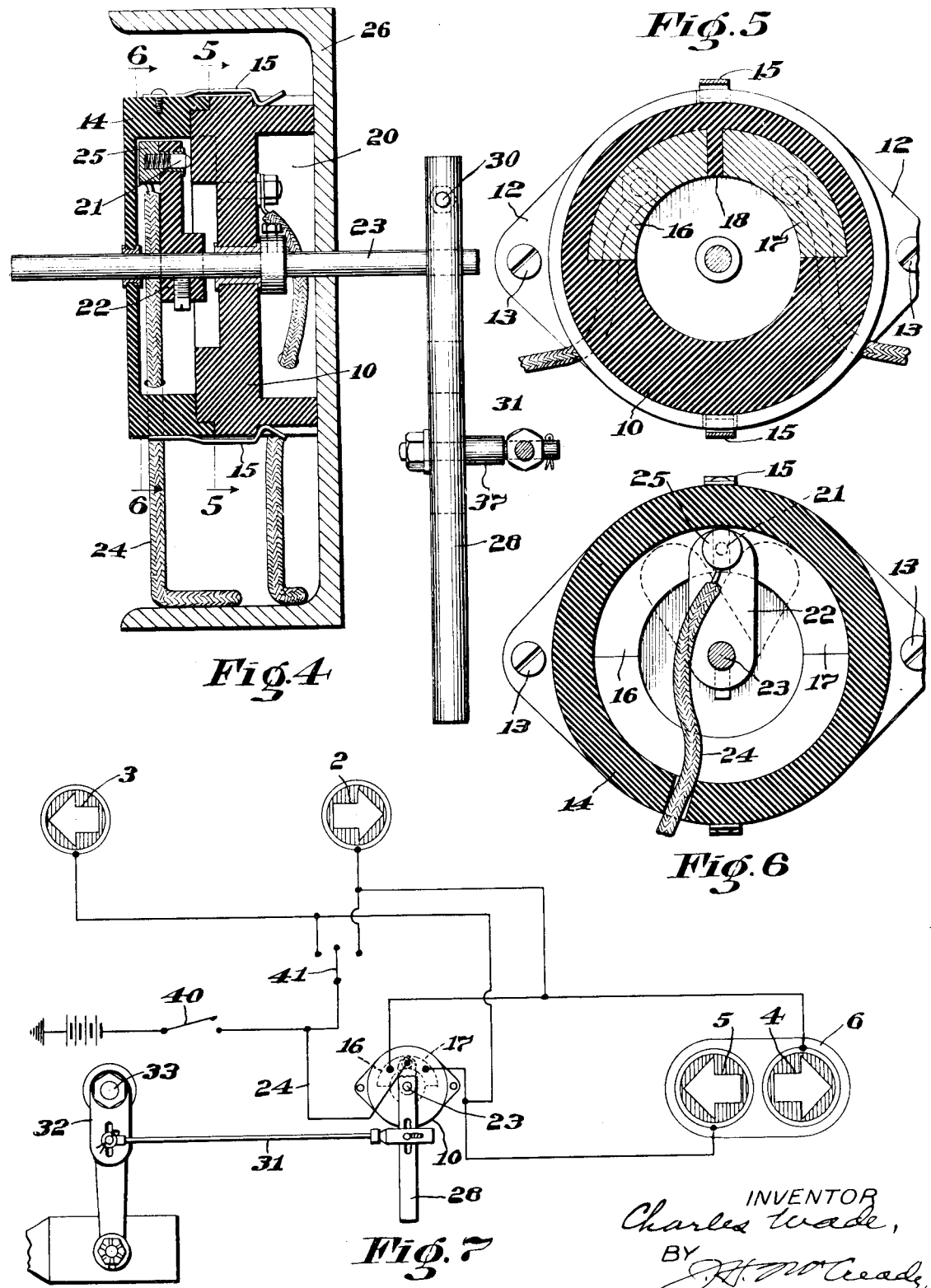

Patented Aug. 22, 1933

1,923,343

UNITED STATES PATENT OFFICE 1,923,343

CONTROLLING APPARATUS FOR AUTOMOBILE SIGNAL SYSTEMS

Charles Wade, Arlington, Mass.

Application December 3, 1931. Serial No. 578,663

3 Claims. (Cl. 200—59)

This invention relates to direction signalling apparatus for use on motor vehicles and is more especially concerned with the controlling mechanism for apparatus of this general character.

It has been proposed heretofore to equip a motor vehicle with right and left direction signals, usually mounted on both the front and rear of a vehicle, so as to enable the driver to indicate both to the oncoming vehicle and to the traffic behind him, his intention to turn either to the right or left. The present invention relates more especially to the circuit controlling apparatus for signal systems of this general type, and it aims to improve such apparatus with a view to facilitating its installation and also affording to the driver a better control of the signal system.

The nature of the invention will be readily understood from the following description when read in connection with the accompanying drawings, and the novel features will be particularly pointed out in the appended claims.

In the drawings,

Figure 1 is a perspective view illustrating an arrangement constructed in accordance with this invention;

Fig. 2 is a side elevation showing, on a larger scale, the controlling apparatus illustrated in Fig. 1;

Figs. 3 and 4 are sectional views approximately on the lines 3—3 and 4—4, Fig. 2;

Figs. 5 and 6 are sectional views approximately on the lines 5—5 and 6—6, respectively, Fig. 4; and Fig. 7 is a diagrammatic view of the entire signal system.

Referring first to Figs. 1 and 7, the arrangement there shown comprises right and left arrows 2 and 3, respectively, arranged to be electrically illuminated at will and mounted on the front portion of the vehicle, and similar arrows 4 and 5 both mounted in a casing 6 secured on one of the rear mud guards. The arrows 2 and 3 may conveniently be supported in the side lights, one of which is shown in Fig. 1 at 7. An electric lamp is associated with each arrow for the purpose of illuminating it, and all the lamps are arranged to receive their power from the storage battery or generator of the motor vehicle, the two left arrows being connected in parallel with each other while the two right arrows are similarly connected together. In these respects the arrangement is similar to those suggested heretofore. In fact, the signals themselves may take any convenient form and may be arranged in any suitable manner, the present invention not being concerned with these elements of the system.

The controlling apparatus provided by this invention comprises a switch, best shown in Figs. 4, 5 and 6, and connections between said switch and the steering mechanism for operating the switch. Referring to the figures just mentioned, the switch there illustrated comprises a base 10 of insulating material, approximately circular in outline, and provided with laterally extending ears 12—12 to receive screws or bolts 13—13 by means of which the switch may be secured in its operative position. Removably mounted on the base 10 is a cover 14 also made of insulating material and normally held in its operative position on the base by means of spring fingers 15—15, Fig. 4. Two stationary contacts 16 and 17, respectively, Fig. 5, are set into the insulating base 10 with their exposed surfaces flush with the inner surface of the base, these contacts being arcuate in form and separated by a narrow strip 18 of insulation. Binding posts rigid with these contacts project into a chamber 20 formed in the lower side of the base of the switch where the conductors leading to the signal devices are connected to the respective binding posts. In this particular construction the movable element of the switch consists of a spring pressed contact 21 mounted on an insulating arm 22 which is secured fast on an operating shaft 23 that extends through the axial portion of the entire switch. The movable contact 21 is connected to the live side of the circuit by means of a conductor 24 which is led through the casing 14 and is soldered or otherwise secured to the metal piece 25 in which the contact 21 is mounted.

This switch preferably is mounted on the metal channel beam 26 which extends longitudinally of the chassis frame. As shown, the switch is secured to the inside of this channel member in order better to protect it from mud and water. In many cases, however, it will be found more convenient to secure this switch on the outer side of the channel.

The connections for operating the switch comprise an arm 28 drilled at its upper end to receive the shaft 23 and split longitudinally so that the split sections may be clamped on the shaft by means of the screw 30. A link 31 connects the arm 28 with another arm 32, preferably extending approximately parallel to the arm 28 and secured fast on the end of the steering gear shaft 33. This shaft is rocked backward and forward by the usual connections between it and the steering wheel 34. Preferably the arm 32 is made of sheet metal of fairly heavy gage so that it can be secured on the shaft 33 simply by removing the nut 35 which clamps the steering arm 36 on the splined section of the shaft, slipping the arm 32 on this shaft and then securing it in place by means of a lock washer and the nut 35.

It is desirable to be able to adjust the range of movement of the switch arm 22 and to some extent also the ratio between this range of movement and that of the arm 32. For this purpose both the arms 28 and 32 are slotted so that the points of connection of the link 31 with these arms can be adjusted toward and from the respective axes on which the arms swing. The construction of the pivot stud 37 which connects the link with the arm 28 will be obvious from an inspection of Fig. 4 and a similar connection is used at the opposite end of the link.

As shown in Fig. 6 the movable contact 21 is only very slightly smaller in diameter than the width of the insulating strip 18 which separates the two stationary contacts 16 and 17. Consequently, a relatively small movement of the steering wheel 34 is sufficient to swing the movable contact 21 into engagement with either of the stationary contacts and thus to set either the right or left direction signals, as desired. Normally the movable contact remains in its neutral or intermediate position between the stationary contacts so that neither signal is set, and the degree of movement required to operate one set of signals or the other preferably is such that the movements of the steering wheel ordinarily required in straight driving, or even in taking slow turns and in drifting from one side of the road to the other, will not set either signal. At the same time the driver can operate either signal whenever he desires simply by cutting the wheel a little harder in the desired direction. While, therefore, the operation of the signals is entirely automatic, it is always under the control of the driver and he can, by suitably changing his method of driving, operate the signal or not, as best suits his purposes.

The installation of the apparatus is greatly facilitated by the nature of the design, particularly the manner in which the arm 32 is mounted, and the fact that it is necessary to drill only two holes to take the bolts for securing the switch 10 in place if it is to be mounted on the outside of the channel 26, and an additional hole for the shaft 23 if the switch is to be secured on the inside of the channel. The nature of the design is such that the effort required to operate the switch is minimized, there is practically no danger of the apparatus getting out of order, and there is relatively little liability of the parts becoming so loaded up with ice or snow as to interfere with the operation of the switch.

Usually the conductor 24 is connected to the dead side of the ignition switch, this switch being indicated diagrammatically at 40, Fig. 7, but in some cases it may be found preferable to run this wire to the delivery side of the low potential circuit for the ignition system so that the lamps which illuminate the signals will be flashed continuously so long as the signal remains in its "on" position. There are also circumstances under which it is desirable to be able to operate the signal manually, as, for example, in giving an advance signal. For this purpose a hand operated switch of the double throw type may be connected in parallel with the switch 10 as shown at 41 in Fig. 7. Preferably this switch is arranged to return automatically to its neutral position as soon as it is released by the driver.

The invention thus provides an exceptionally reliable controlling apparatus for direction signal systems which can be easily installed and is readily adjustable to meet the requirements of individual machines.

While a preferred embodiment of the invention has been herein shown and described, it will be evident that the invention is susceptible of embodiment in other forms without departing from the spirit or scope thereof. For example, in this particular switch the contact 21 is moved and the contacts 16 and 17 are stationary, but the latter contacts could be mounted for movement and the contact 21 made stationary without affecting the construction or operation of the apparatus in any substantial respect.

Having thus described my invention, what I desire to claim as new is:

1. In a signal system for motor vehicles in which right and left electrically operated direction signals are arranged to be controlled through the steering mechanism, the combination with an electric switch having two stationary contacts connected, respectively, with said right and left signals, means for supporting said contacts closely adjacent to but insulated from each other, and a third contact mounted for movement from an intermediate neutral position into engagement with either of said stationary contacts, as desired, of connections for operating said movable contact including an arm independent of the steering mechanism but removably secured on the end of the steering gear shaft, a second arm connected with said movable contact, and a link connecting said arms.

2. In a signal system for motor vehicles in which right and left electrically operated direction signals are arranged to be controlled through the steering mechanism, the combination with an electric switch having two stationary contacts connected, respectively, with said right and left signals, means for supporting said contacts closely adjacent to but insulated from each other, and a third contact mounted to swing about an axis from a neutral position between said contacts into engagement with either of said stationary contacts, as desired, of connections for operating said swinging contact including an arm independent of the steering mechanism but removably secured on the end of the steering gear shaft, a second arm connected with said movable contact, and a link connecting said arms, both of said arms being constructed to permit adjustment of the distances between the points of connection to them of said link and the respective axes on which said arms swing.

3. In a signal system for motor vehicles in which right and left electrically operated direction signals are arranged to be controlled through the steering mechanism, the combination with an electric switch having two stationary contacts connected, respectively, with said right and left signals, means for supporting said contacts closely adjacent to but insulated from each other, and a casing enclosing said contacts of a shaft extending through said casing and projecting at opposite sides thereof, a third contact carried by said shaft for movement from an intermediate neutral position into engagement with either of said stationary contacts, and connections for operating said shaft including an arm removably secured on the end of the steering gear shaft but otherwise independent of the steering mechanism, a second arm removably clamped on said switch shaft and a link connecting said arms.

CHARLES WADE.